(12) United States Patent
Yamada et al.

(10) Patent No.: US 6,272,397 B1
(45) Date of Patent: Aug. 7, 2001

(54) ORTHOGONAL TYPE THREE-AXIS ROBOT AND A CONTROL METHOD THEREOF

(75) Inventors: Masashi Yamada; Takashi Abe; Taro Amano, all of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/113,297

(22) Filed: Jul. 10, 1998

(30) Foreign Application Priority Data

Jul. 22, 1997 (JP) .................................................... 9-196020

(51) Int. Cl.⁷ .................................................... G05B 15/00
(52) U.S. Cl. .............................. 700/245; 700/56; 700/262
(58) Field of Search ............................. 700/56, 245, 250, 700/251, 253, 254, 255, 260, 247–249, 261, 262, 264

(56) References Cited

U.S. PATENT DOCUMENTS

| | | | |
|---|---|---|---|
| 4,530,062 | * | 7/1985 | Inaba et al. ........................... 700/250 |
| 4,743,465 | * | 5/1988 | Saeki et al. ............................. 427/96 |
| 4,882,527 | * | 11/1989 | Yakuyama et al. ................... 318/568 |
| 5,134,665 | * | 7/1992 | Jyoko ....................................... 382/8 |
| 5,193,314 | * | 3/1993 | Wormley et al. .................. 51/165.71 |
| 5,369,493 | * | 11/1994 | Tomita et al. ......................... 356/400 |
| 5,520,951 | * | 5/1996 | Yasuhara ................................. 427/8 |
| 5,558,091 | * | 9/1996 | Acker et al. ....................... 128/653.1 |
| 5,698,121 | * | 12/1997 | Kosaka et al. .................. 219/121.67 |
| 5,751,917 | * | 5/1998 | Kim et al. ............................ 700/254 |
| 5,809,652 | * | 9/1998 | Ducret .................................. 30/90.7 |
| 5,854,745 | * | 12/1998 | Muraoka et al. ....................... 700/56 |

* cited by examiner

Primary Examiner—Thomas Lee
Assistant Examiner—Rijue Mai
(74) Attorney, Agent, or Firm—Wenderoth, Lind & Ponack, L.L.P.

(57) ABSTRACT

In an orthogonal type three-axis robot for mounting a part on or removing a part from a board, a hand element placed on a supporting element for holding a part is moved by an X-axis step motor, a Y-axis step motor, and a Z-axis step motor, and heights or Z coordinates of four reference points formed on the board are previously measured. When mounting a part to or removing a part from a specified position by utilizing the hand element, a height or Z coordinate of the hand in the direction of Z axis is corrected for the specified position by using the heights or Z coordinates of three of the four reference points.

28 Claims, 8 Drawing Sheets

ORTHOGONAL TYPE THREE-AXIS ROBOT AND A CONTROL METHOD THEREOF

BACKGROUND OF THE INVENTION

1. Field of the Invention

The present invention relates to an orthogonal type three-axis robot used for mounting or removing parts into or from a printed board or the like and, and a control method for effecting a height control.

2. Description of Related Art

Figure 1:
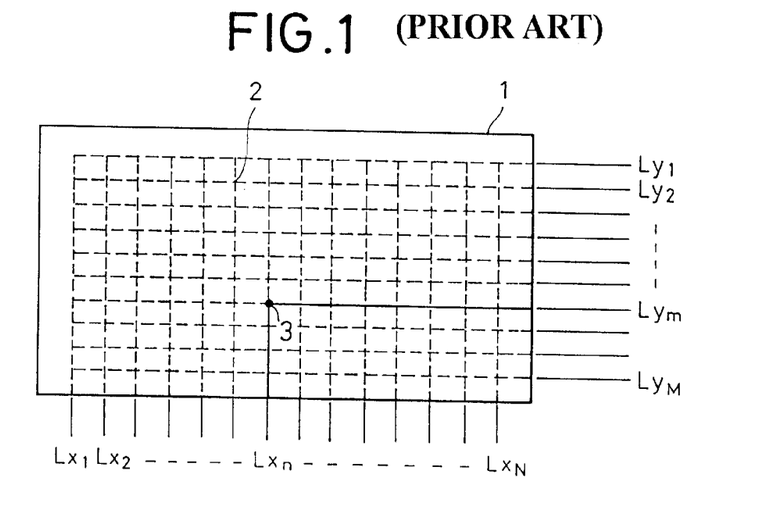
FIG. 1 is a plan view showing a matrix board.
Figure 2:
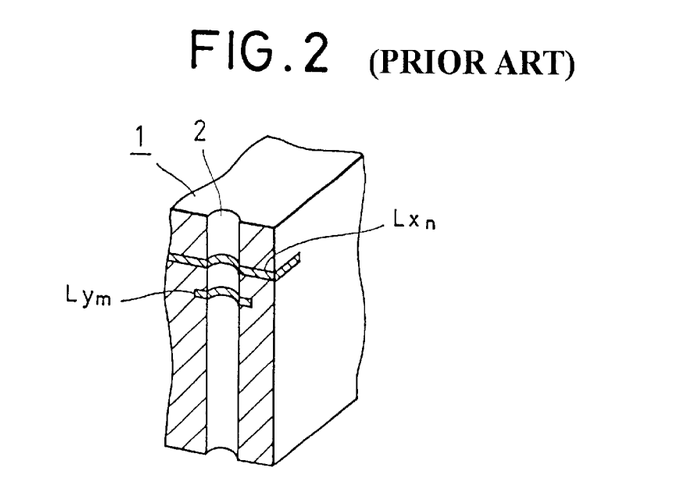
FIGS. 2 and 3 are diagrams showing perspective views of a through hole shown in FIG. 1 and a connection pin, respectively.
Figure 3:
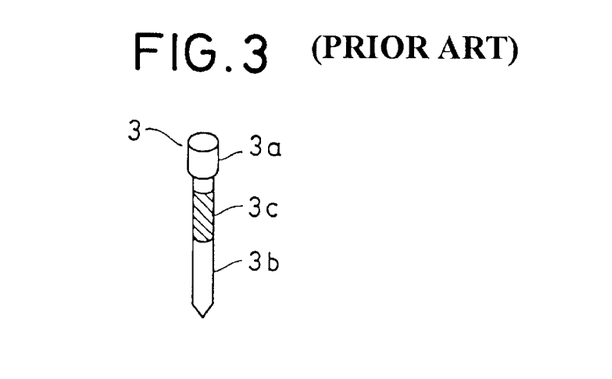
Figure 4:
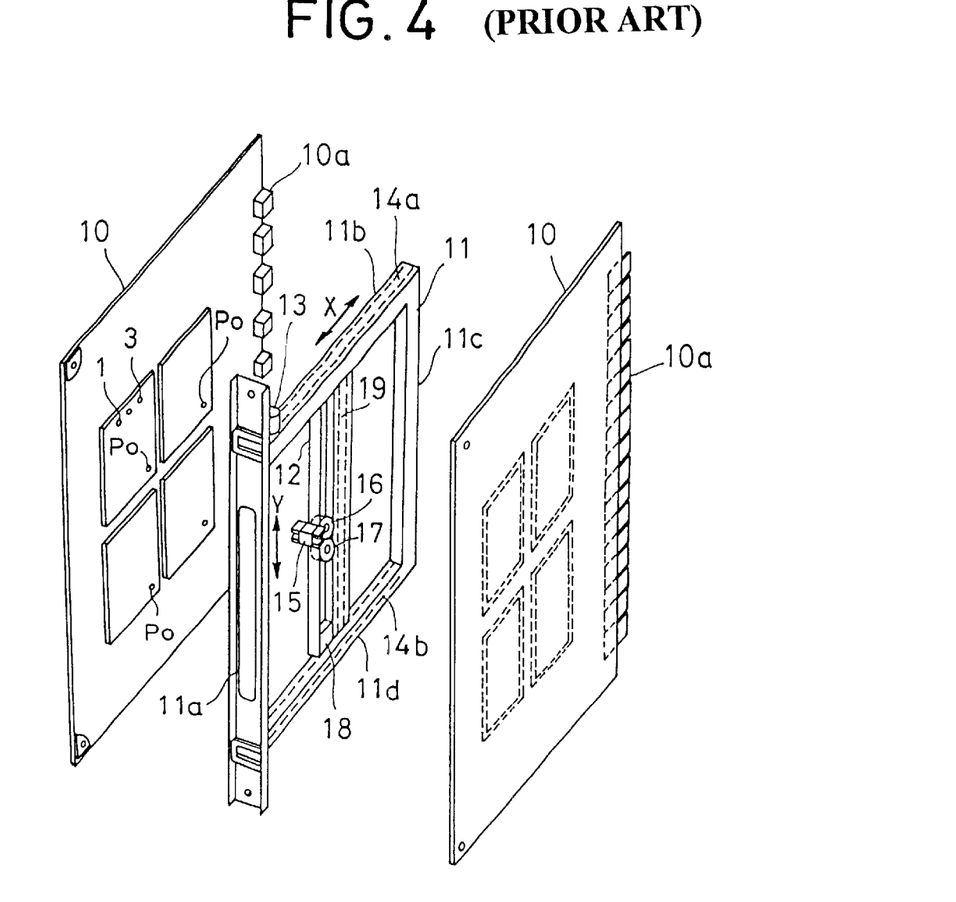
FIG. 4 is a diagram showing a perspective view of a conventional orthogonal type three-axis robot.

Orthogonal type three-axis robots are conventionally used for industrial purposes, and have a function to package parts into or remove parts from a printed board. The orthogonal type three-axis robot used in an MDF (Main Distributing Frame) is operative to insert or remove a connection pin into or from a hole formed in a matrix board 1 which is a form of printed boards. FIG. 1 is a plan view showing a matrix board 1, while FIGS. 2 and 3 show perspective views of a through hole 2 and a connection pin 3, respectively. FIG. 4 is a perspective view generally showing an example of the conventional orthogonal type three-axis robot.

As shown in FIG. 1, formed on the matrix board 1 are a plurality of lines $Lx_1$, to $Lx_N$ (N is a natural number) on a primary side (referred to as primary lines hereinafter), and a plurality of lines $Ly_1$ to $Ly_M$ on a secondary side (referred to as secondary lines hereinafter). When an arbitrary one $Lx_n$ of the primary lines $Lx_1$ to $Lx_N$ and an arbitrary one $Ly_m$ of the secondary lines $Ly_1$ to $Ly_M$ of the secondary lines $Ly_1$ to $Ly_M$ are to be connected to each other, it is only necessary to connect the line $Lx_n$ to line $Ly_m$ at a point where the lines cross each other. For the purpose, the through holes 2 are proved at points where each of the primary lines $Lx_1$ to $Lx_N$ crosses each of the secondary lines $Ly_1$ to $Ly_M$. When the connection pin 3 is inserted into the through hole 2 at a point where the line $Lx_n$ crosses the line $Ly_m$, the line $Lx_n$ and the line $Ly_m$ are connected to each other, thereby one communication line that creates linking between the primary and secondary sides is formed.

The matrix board 1 has a multi-layered structure as represented by its cross section shown in FIG. 2, in which the lines $Lx_1$ to $Lx_N$ are formed in one of the layers, while the lines $Ly_1$ to $Ly_M$ are formed in another layer. The connection pin 3, on the other hand, has a circular cylinder-shaped head section 3a, and a rod-shaped under-neck section 3b extending from the head section 3a, as illustrated in FIG. 3. The head section 3a and under-neck section 3b are made from such a material as an insulating plastic, and a gold plating 3c is applied over the circumferential surface of an intermediate section of the under-neck section 3b. With this structure, the gold plating 3c is used for the connection between the lines $Lx_1$ and $Lx_N$ and lines $Ly_1$ to $Ly_m$, and the length of the gold plating 3c is made equal to a distance between the lines $Lx_1$ to $Lx_N$ and lines $Ly_1$ to $Ly_M$ in the height or thickness direction. By inserting the connection pin 3 into the through-hole 2 until the under-neck section 3b described above contacts the layers having the primary and secondary lines, a desired one of the lines $Lx_1$ to $Lx_N$ can selectively be connected to a desired one of the lines $Ly_1$ to $Ly_M$.

FIG. 4 shows an orthogonal type three-axis robot used for inserting the connection pin 3 at a specified position on the matrix board 1 shown in FIG. 1, in which a frame 11 facing a mother board 10 on which a plurality of matrix boards 1 are carried is provided. The frame 11 comprises four supporting elements 11a, 11b, 11c, and 1d which together form a rectangular shape, and provided between the supporting elements 11b and 11d, which are opposite to each other, is a movable supporting element 12 which can freely move in the longitudinal direction of the supporting elements 11b, 11d, namely in the direction of X-axis, which is a lateral direction of the matrix board 1. An X-axis step motor is provided on the supporting element 11b, and X-axis belts 14a, 14b driven by the X-axis step motor and moving the supporting element 12 are attached to the supporting element 11b and supporting element 11d respectively.

Figure 5:
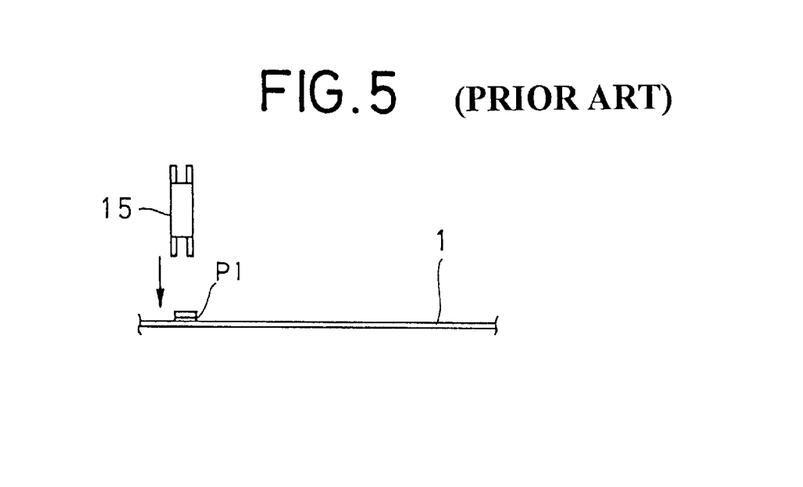
FIG. 5 is a side view showing a positional relationship between the board and the hand element shown in FIG. 4.

Provided on the supporting element 12 are a hand element 15 made of a metal material, which is typically shown in FIG. 5, and functions as a holding device for holding the connection pin 3, a hand opening and closing direct current (DC) motor 16 for opening or closing the hand element 15, a Z-axis step motor 17 for moving a position of the hand element 15 in the height or thickness direction, namely in the direction of Z axis, a Y-axis step motor 18, and a Y-axis feed belt 19 driven by the Y-axis step motor 18 which moves the hand element 15, hand opening and closing DC motor 16, and Z-axis step motor 17 in the longitudinal direction of the matrix board 1, namely the direction of Y-axis.

To minimize an installation area of the orthogonal type three-axis robot, for instance, four matrix boards 1 are fixed to the mother board 10, and two mother boards 10 are provided on both sides of the robot. Provided on each mother board 10 are a plurality of connectors 10a for accommodating the primary lines $Lx_1$ to $Lx_N$ and secondary-lines $Ly_1$ to $Ly_N$ for each board. A step motor is used for each of the motors 13, 17, 18 in order to reduce the cost of the robot. A cylinder may also be used in place of the DC motor 16 for opening or closing the hand element 15.

Now, description is made for operations for mounting (or, inserting) the connection pin 3 by the orthogonal type three-axis robot shown in FIG. 4.

The robot first checks the position of an original point on each of the matrix boards 1 upon start of the power supply, and then moves the hand element 15 to an original point Po on a target matrix board 1 by driving the step motors 13, 17, and 18. Instructions regarding the position for inserting the connection pin 3 are given to the robot from a system of a higher rank. The inserting position is given as relative moving distances of the hand element 15 in the directions of X, Y, and Z-axes from the original position Po. After the hand element 15 returns to the original position Po, the robot computes the height of the board 1 for determining the height of a working surface of the hand element 15, by using the hand element 15 as a measuring device for measuring the height of the matrix board 1.

FIG. 5 is a side view showing a relation between the board and hand element in FIG. 4.

Provided on the surface of each board 1 and projecting therefrom is a reference point PI for the measurement of height. This reference point PI is, for instance, made from metal, and is connected to a ground layer provided on a rear surface of the board 1. The robot moves the hand element 15 to a position above (in the direction of Z axis) the reference point PI in the state where a voltage is loaded thereto. Then the robot moves the hand element 15 toward the matrix board 1 in the direction of Z axis until the hand element 15 comes into contact with the reference point PI. As a result of this contact, a current flows from the hand element 15 to the ground, and a height of the reference point PI is measured by using a moving distance of the hand element 15 in the direction of Z axis. The height of the reference point PI measured as described above is stored as the height of the matrix board 1.

After this step, the robot performs the position control of the hand element 15 in the direction of X axis, the direction of Y axis, and the direction of Z axis based on an inserting position of the connection pin 3 is given by the system of higher rank and the height of the board 1, and inserts the connection pin 3 into a specified position of the board 1.

However, when inserting the connection pin 3 by using a conventional method of controlling the height of an orthogonal type three-axis robot, the following problem has been encountered.

Namely, if there exists any distortion in the direction of height in a mother board 10 serving as a base for each matrix board 1 or in the matrix board 1 itself, sometimes the connection pin 3 cannot be inserted into the through-hole 2 at some of the inserting positions, or connection fault may be generated between the primary lines $Lx_l$ to $Lx_N$ and secondary lines $Ly_l$ to $Ly_m$ on the matrix board 1. For this reason, not only reduction in working ratio of the robot, but also degrading of the connection quality are often experienced.

To solve the problems as described above, the following scheme is adopted according a first aspect of the present invention. In a method for controlling an orthogonal type three-axis robot which comprises a holding device for holding a part to be mounted on a board fixed on a base, or for removing a part to be removed from the board, provided is a driving system for supporting the holding device relative to the base and at the same time moving the holding device in a direction of X-axis which is a lateral direction of the board, in a direction of Y-axis which is a longitudinal direction of the board, and in a direction of Z-axis which is a direction of height or thickness of the board. Also provided is a measuring device for measuring a height or Z-axis coordinate of a surface of the board. The driving system moves the holding device in the direction of X-axis as well as in the direction of Y-axis, and also moves the holding device in the direction of Z-axis according to the measured height or Z-axis coordinate for adjusting a height or Z-axis coordinate position of the holding device to a height or Z-axis coordinate of a board surface to which or from which a part is to be mounted or removed. At a plurality of specified positions, a step is provided for correcting a moving distance of the holding device in the direction of Z-axis, when moved by the driving device, for each of the specified positions.

According to a second aspect of the present invention, in the method for controlling an orthogonal type three-axis robot according to the first aspect of the present invention, at first, heights, i.e. the Z axis coordinates, of four points which form a rectangle on the surface of the board and measured by the measuring device. Then, by using X, Y, and Z (height) coordinates of three points among the four points, a height or Z-axis coordinate of each specified position located inside an area of the three points is estimated, and a moving distance in the direction of Z axis, when the holding device is moved by the driving system, is corrected according to the estimated height or Z-axis coordinate.

According to a third aspect of the present invention, in the method for controlling an orthogonal type three-axis robot according to the first aspect of the invention, at first, heights, i.e. the Z-axis coordinates of four points forming a rectangle on a surface of the board and a height or Z-axis coordinate of a point inside the rectangle are measured by the measuring device. Then, from X and Y coordinates and heights or Z-axis coordinates of two points from among the four points forming the rectangle, and a height or Z-axis coordinate of one point inside the rectangle, a height or Z-axis coordinate of each of the specified positions inside a triangle formed by these three points is estimated respectively, and a moving distance in the direction of Z axis, when the holding device is moved by the driving system, is corrected according to the estimated height or Z axis coordinate.

According to a fourth aspect of the present invention, there is provided an orthogonal three-axis robot comprising a holding device for holding a part to be mounted on a board fixed on a base, or for removing a part to be removed from the board; a driving system for supporting the holding device above or relative to the base and moving the holding device in a direction of X axis which is a lateral direction of the board, in a direction of Y axis which is a longitudinal direction thereof, and in a direction of Z axis which is a height or thickness direction thereof; and a measuring device for measuring a height or Z-axis coordinate of a surface of the board. The holding device is moved in the direction of X axis well as in the direction of Y axis by the driving system, and also is moved in the direction of Z axis according to the measured height or Z-axis coordinate to adjust a height or Z-axis coordinate of the holding device to a height or Z-axis coordinate of a surface of the board, and then mounts or removes a part on or from the board, wherein by the driving system, a moving distance thereof in the direction of Z axis, when moving the holding device, is corrected for each of the specified positions.

According to a fifth aspect of the present invention, in the orthogonal type three-type robot according to the fourth aspect of the present invention, the measuring device and the driving system are configured to perform the following operations.

Namely, the measuring device is operative to measure heights, i.e. Z axis coordinates, of the four points forming a rectangular form on a surface of the board, and the driving system is operative to estimate, from X coordinates and Y coordinates of three points of the four points, a height or Z-axis coordinate of each of the specified positions inside a triangle formed by the three points, respectively, and to correct, when moving the holding device with the driving system, a moving distance in the direction of Z axis according to the estimated height or Z-axis coordinate.

According to a sixth aspect of the present invention, in the orthogonal type three-axis robot according to the fourth aspect of the present invention, the measuring device and the driving system are configured to perform the following operations.

Namely, the measuring device is operative to measure heights, i.e. Z-axis coordinates, of four points forming a rectangular form on a surface of the board and a height, i.e. Z-axis coordinate, of one point inside the rectangular form, and the driving system is operative to estimate, from X coordinates and Y coordinates as well as the heights or Z coordinates of two points of the four points forming the rectangular form, and also from an X coordinate and a Y coordinate as well as a height or Z coordinate of the specified position inside the rectangle, a height or Z coordinate of the specified position inside a triangle formed by these three points for each specified position, respectively, and to correct a moving distance in the direction of Z axis, when moving the holding device with the driving system, according to the estimated height or Z coordinate for each of the specified positions, respectively.

According to the features relating to the first to sixth aspects of the present invention, the method includes controlling the orthogonal type three-axis robot having the configuration as described above, in which the holding device is moved by the driving system to a specified position on the board, and the orthogonal type three-axis robot mounts a part on the board at a specified position or removes a part which has been mounted on the board. Furthermore, with the configuration described above, even if there exists any distortion in a height or thickness direction of the board due to inclination of the base or for some other reason, the height or Z coordinate of the holding device can be corrected for each position at which parts are mounted to or removed from the board. For this reason, the problems encountered in the prior art described before are completely eliminated.

DETAILED DESCRIPTION OF THE PREFERRED EMBODIMENTS

First Embodiment

Figure 6:
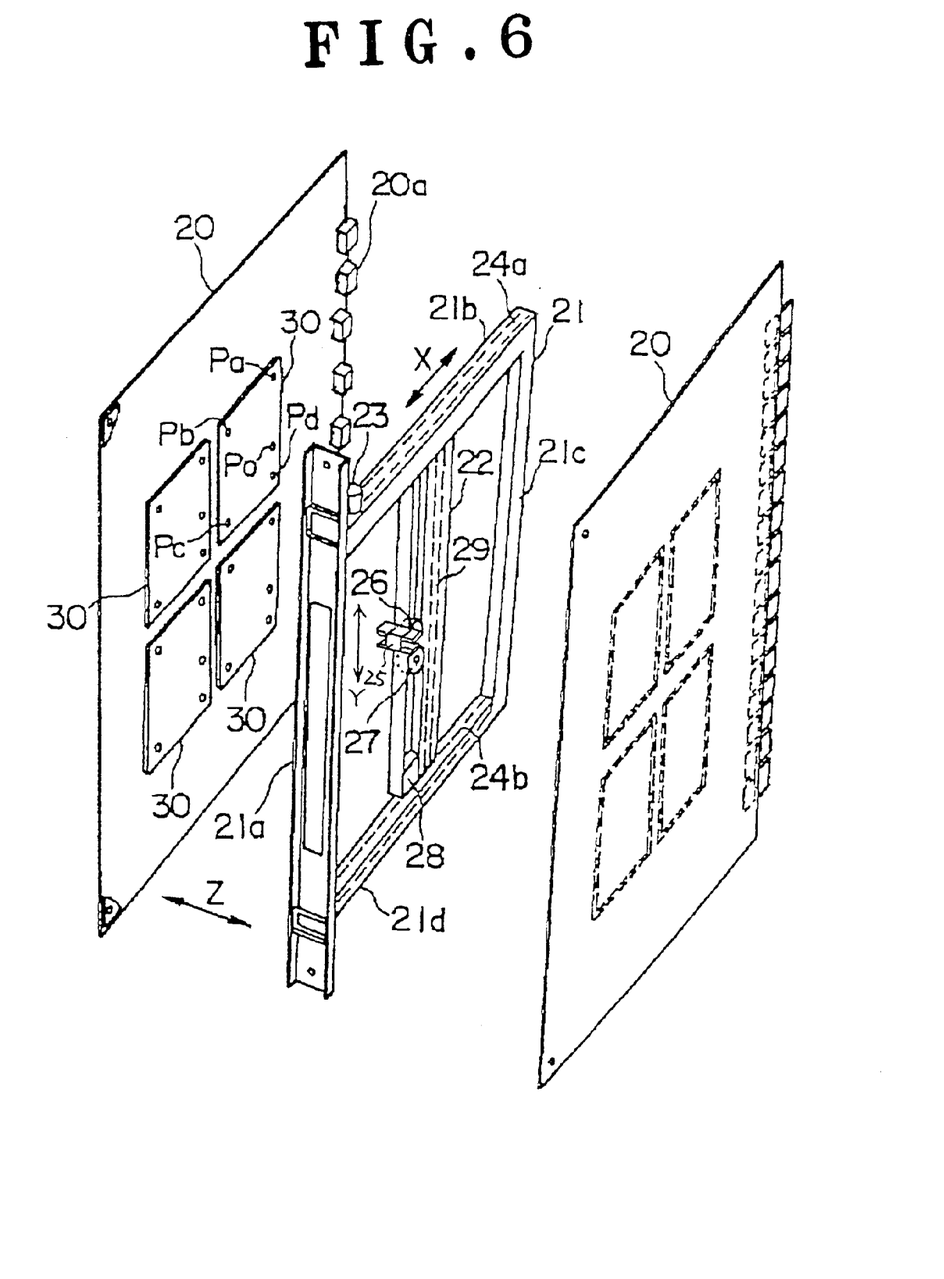
FIG. 6 is a perspective view showing a key section and a board of an orthogonal type three-axis robot according to a first embodiment of the present invention.

FIG. 6 is a diagram showing a perspective view of the first embodiment of the orthogonal type three-axis robot and boards according to the present invention.

The orthogonal type three-axis robot has a frame 21 facing a mother board 20 used as a base and carrying a plurality of matrix boards 30, which is similar to that shown in FIG. 4. The frame 21 comprises four supporting elements 21a, 21b, 21c, and 21d each constituting one edge of a rectangle formed by the four supporting elements, and a supporting element 22. The supporting element 22 can freely move in the direction of the supporting elements 21b and 21d (namely in the direction of X axis of the board 30), and is provided between the supporting elements 21b and 21d placed opposite to each other. An X-axis step motor 23 is provided on the supporting element 21b, and the X-axis feed belts 24a, 24b driven by the X-axis step motor 23 and moving the supporting element 22 are attached to the supporting elements 21b and 21d, respectively.

Provided on the supporting element 22 are a hand element 25 made from a metal material that is a holding device for holding a connection pin 3, a hand opening/closing DC motor 26 for opening and closing the hand element 25, a Z-axis step motor 27 for moving a position of the hand element 25 in the direction of Z axis which is a height or thickness direction, a Y-axis step motor 28, and a Y-axis feed belt 29 driven by the Y-axis step motor 28 and moving the hand opening/closing DC motor 26 and Z-axis step motor 27 in the direction of Y axis.

In the orthogonal type three-axis robot, for instance, four sheets of board 30, which are slightly different from the conventional one and are fixed on the mother boards 20, and are provided on both sides of the frame 21.

Formed on each board 30 are, like on the board 1 shown in FIGS. 1 and 2, a plurality of primary lines $Lx_1$ to $Lx_N$ and a plurality of secondary lines $Ly_1$ to $Ly_M$, respectively. However, unlike the board 1, four reference points Pa, Pb, Pc, and Pd are provided on the surface of each board 30 in a manner that the four reference points define a rectangle. Provided on each mother board 20 are a plurality of connectors 20a for receiving the primary lines $Lx_1$ to $Lx_N$ and secondary lines $Ly_1$ to $Ly_M$ on each board.

Figure 7:
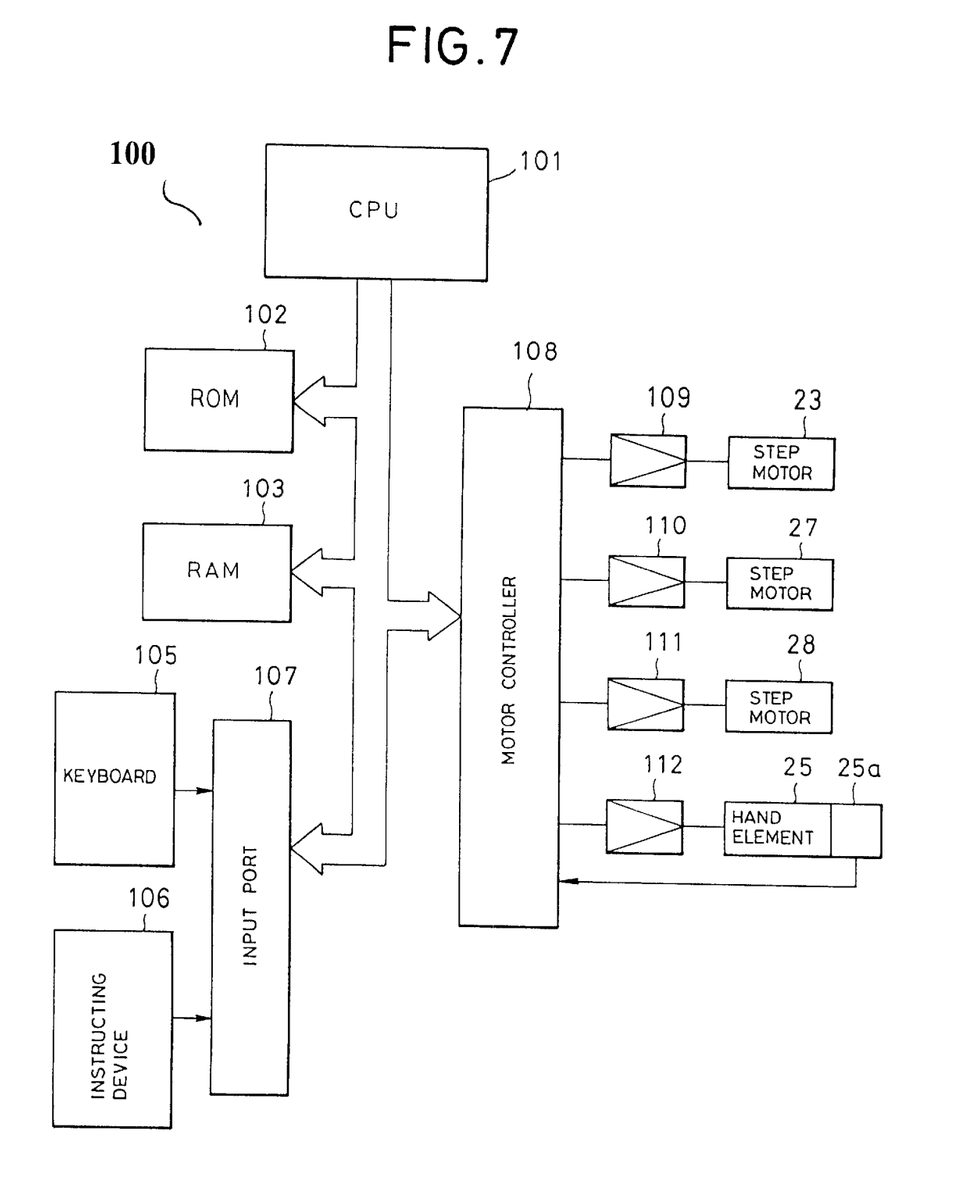
FIG. 7 is a diagram showing the structure of a control system of the orthogonal type three-axis robot shown in FIG. 6.

FIG. 7 shows the structure of a control system of the orthogonal type three-axis robot shown in FIG. 6.

The control system which is generally represented at 100 comprises a CPU 101 to which a ROM 102 storing programs and data, and a RAM 103 in which a control program is loaded and data are to be stored, are connected through a bus 104. A keyboard 105 and an instructing device 106 are connected to the bus 104 through an input port 107. A motor controller 108 which functions as an interface is also connected to the bus 104. The X-axis step motor 23, Y-axis step motor 27, Z-axis step motor 28, and hand element 25 are connected to the motor controller 108 through drivers 109 to 112, respectively, so that driving pulses produced at drivers 109 to 112 according to the operation of the control system are respectively supplied to a corresponding one of the step motors 23, 27 and 28, and hand element 25. An output signal of a contact sensor 25a (which can simply be a body of the hand element 25 itself) of the hand element 25 is supplied to the motor controller 108.

Now, description is made for operations of the orthogonal type three-axis robot shown in FIG. 6.

The robot at first checks the position of the origin PO on each matrix board 30 after the start of power supply, then drives the step motors 23, 27, 28 to move the hand element 25 to the origin position on each board 30. An instruction for designating a position to which the connection pin 3 is to be inserted is given from a device of higher rank. The inserting position is given as relative moving distances of the hand element 25 in the X-axis, Y-axis, and direction of Z axis from the origin PO. After the hand element 25 has returned to the origin position P0, the robot uses the hand element 25 as a measuring device for measuring a height of the board 30, and computes heights, i.e. Z axis coordinates of the reference points Pa, Pb, Pc, Pd by contacting the hand element 25 to the reference points Pa, Pb, Pc, and Pd, in such a way as depicted in FIG. 5.

Thereafter, the robot sets a three-dimensional position of the hand element 25 by controlling the step motors 23, 27, 28 according to the inserting position for the connection pin 3 given by the device of higher rank and inserts the connection pin 3 into a through-hole at a specified position. The distance of the hand element 25 from the board 30 is corrected for a position of each through-hole according to the measured reference positions Pa, Pb, Pc, and Pd.

Figure 8:
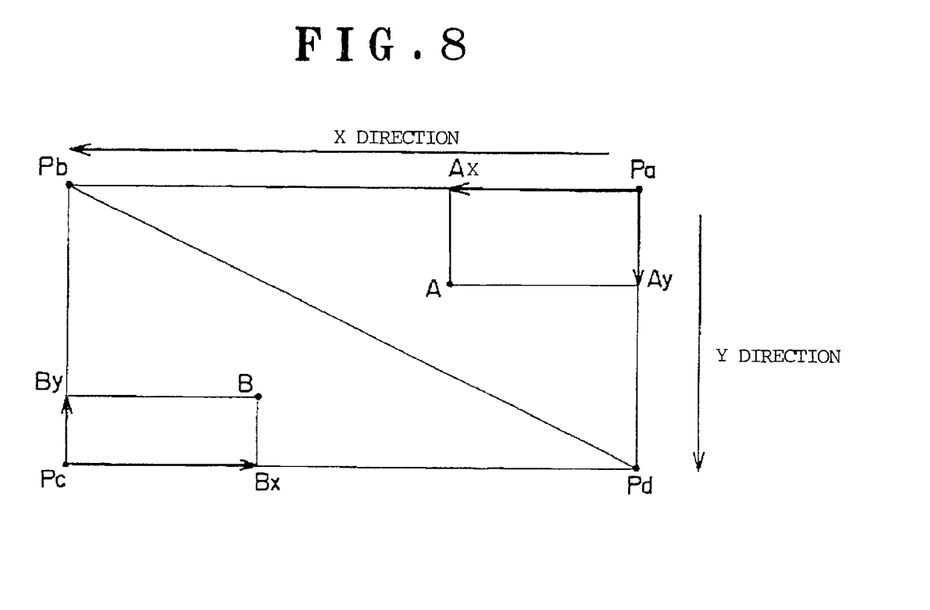
FIGS. 8 through 10 are schematic views for explaining the correction of height in FIG. 6.
Figure 9:
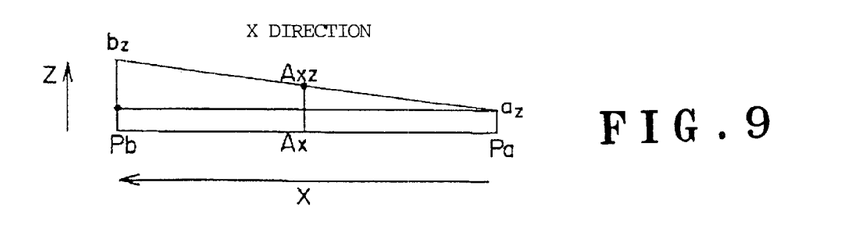
Figure 10:
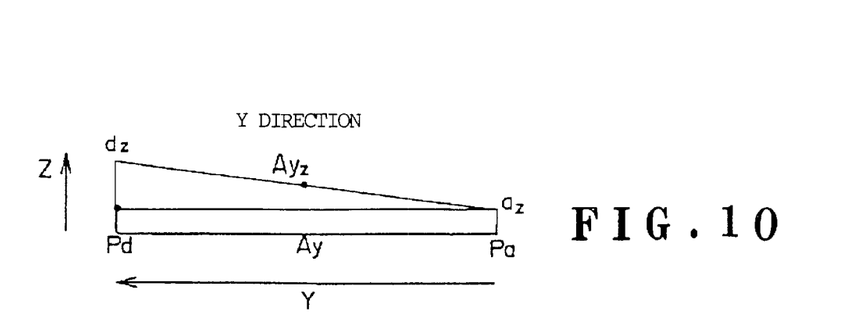

FIG. 8 to FIG. 10 are views each for explaining correction of the distance of the hand element 25 from the board 30, i.e.

the Z coordinate of the hand element 25, wherein FIG. 8 is a plan view showing the board 30, and FIGS. 9 and 10 are side views each showing the board 30. Now, description will be made for a method of correcting the distance or Z coordinate of the hand element 25 with reference to FIGS. 8 to 10.

In the correction method, at first the rectangle formed by the reference points Pa, Pb, Pc, and Pd is divided into two triangles formed by Pa, Pb, Pd and Pb, Pd, Pc, respectively, as shown in FIG. 8. Then, the reference point Pa is used as an origin for distances in one portion of an X-Y plane. The reference position Pc located at the position diagonally opposite to the reference point Pa is used as an origin for distances in another portion of the X-Y plane.

It should be noted that, in FIGS. 8–10, the symbol Ax indicates an intersection between a straight line PaPb connecting the reference points Pa and Pb and a normal line to the straight line PaPb from a point A. The symbol Ay indicates an intersection between a straight line PaPd connecting the reference points Pa and Pd and a normal line to the straight line PaPd from the point A. The symbol By indicates an intersection between a straight line PbPc connecting the reference points Pb and Pc and a normal line to the straight line PbPc from a point B. The symbol Bx indicates an intersection between a straight line PcPd connecting the reference point Pc and reference point Pd and a normal line to the straight line PcPd from the point B.

In FIGS. 9 and 10, heights of Z coordinates at the intersections Ax, Ay are denoted by $Ax_z$ and $Ay_z$ and heights or Z coordinates of the reference points Pa, Pb, and Pd are denoted by $a_z$, $b_z$, and $d_z$, respectively.

When a point within the triangle formed by the reference points Pa, Pb, Pd, which is represented by the point A described above, is designated as the inserting position of the connection pin 3, the height or Z coordinate of the point A is estimated from coordinates of the reference points Pa, Pb and Pd in the manner as described below.

When, on the other hand, a point within the triangle formed with the reference points Pb, Pc, Pd, represented by the point B described above is designated as the inserting position of the connection pin 3, the height or Z coordinate of the point B is estimated from heights or Z coordinates of the three reference points Pb, Pc, and Pd.

When estimating a height or Z coordinate of the point A, the height or distance $Ax_z$ is computed according to the equation (1) below by multiplying a difference between the height or distance $a_z$ of the reference point Pa and height or distance $b_z$ of the reference point Pb by a value obtained by dividing a distance $A_xb$ from the reference point Pa to the intersection $A_x$ by the distance PaPb between the reference points Pa, Pb. The distances used in the equation (1) are obtained from the coordinates of the points Pa, Pb, and A.

$$Ax_z=(b_z-a_z)\times(Axb/PaPb) \qquad (1)$$

Further, the height or distance $Ay_z$ is obtained according to the equation (2) by multiplying a difference between the height or distance $a_z$ of the reference point Pa and height or distance $d_z$ of the reference point Pd by a value obtained by dividing the distance Ayd from the reference point Pa to the intersection Ay by the distance PaPd between the reference points Pa, Pd.

$$Ay_z=(d_z-a_z)\times(Ayd/PaPd) \qquad (2)$$

Then, the height or distance $A_z$ of the point A is obtained by using the values of $Ax_z$ and $Ay_z$ as computed according to the equations (1) and (2), according to equation (3).

$$A_z=(Ax_z+Ay_z)/2+a_z \qquad (3)$$

Similarly, when the connection pin 3 is inserted into the point B inside a triangle formed with the reference points Pb, Pc, and Pd, the height or distance $B_z$ of the point B can be computed in an analogous manner.

The height or Z coordinate of the hand element 25 is corrected according to the height or Z coordinate of the point A or B obtained as described above, and the insertion of the connection pin 3 is executed in accordance with the operation of the control system by using the corrected height or Z coordinate.

Referring to the flowcharts of FIGS. 11 to 13, an example of the above described height or Z coordinate correction procedure which is performed by the control system of the orthogonal type three-axis robot, which is shown in FIG. 7, will be described specifically.

Figures 11, 12, 13:
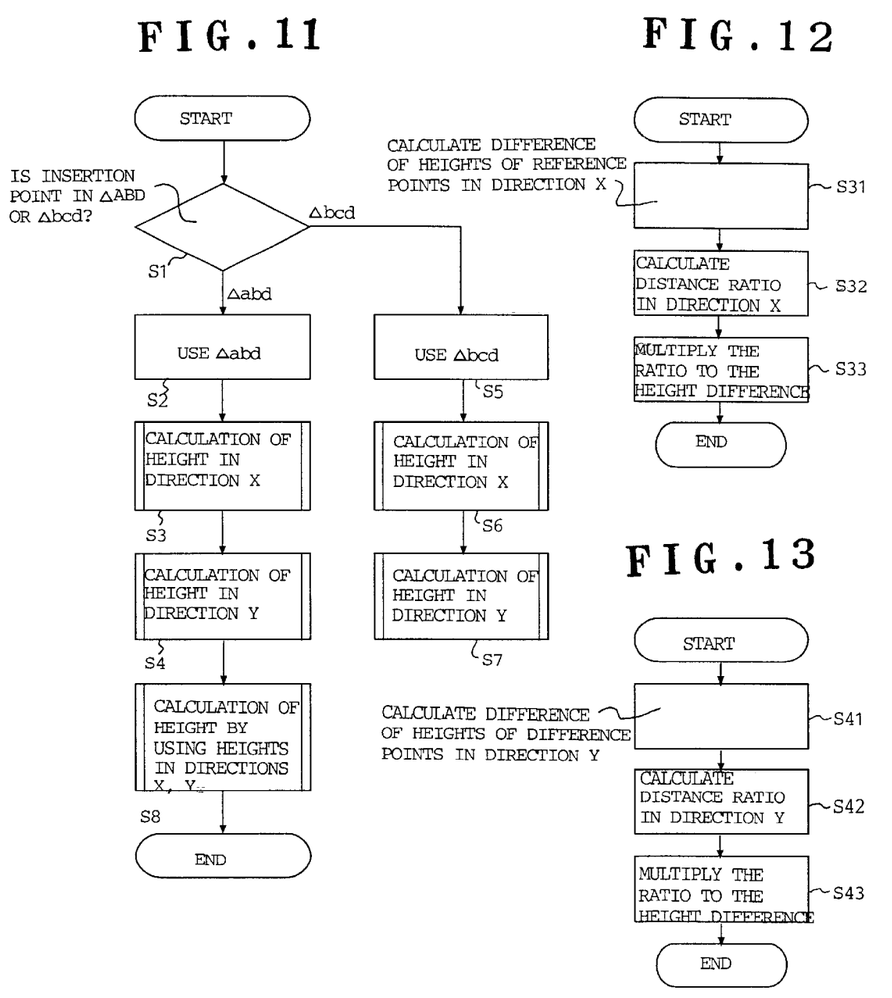
FIGS. 11 through 13 are flowcharts showing the height correction procedure in the first embodiment of the invention.

As shown in FIG. 11, the processor (CPU 101) of the control system initiates the following height or Z coordinate correction procedure upon completion of the measurement of the heights or Z coordinates of the reference points, which is performed after the receipt of the instruction of the pin insertion position.

In step S1, the processor determines whether the designated insertion position belongs to the triangle formed by the points Pa, Pb, Pd (referred to as Δabd) or to the triangle formed by the points Pb, Pc, and Pd (referred to as Δbcd) according to the data of the designated insertion position. If the insertion position belongs to the triangle Δabd, the processor determines that the height or Z coordinate data of triangle Δabd are to be used, and uses the height or Z coordinate data of the reference points Pa, Pb, Pd which have been temporarily stored in RAM 103 (step S2).

Then, the program proceeds to Step S3 in which the relative height or distance $Ax_z$ of the intersection Ax shown in FIG. 8 is calculated by using the heights or Z coordinates of the reference points Pb and Pa in accordance with the equation (1) mentioned above. After the calculation in step S3, the processor proceeds to step S4 in which the relative height or distance $Ay_z$ of the intersection Ay shown in FIG. 8 is calculated by using the heights or Z coordinates of the reference points Pa and Pd in accordance with the equation (2) mentioned above.

Similarly, if it is detected that the insertion position belongs to the triangle Δbcd, the processor determines that the height or Z coordinate data of triangle Δbcd are to be used, and uses the height or Z coordinate data of the references points Pb, Pc, Pd which have been temporarily stored in RAM 103 (step S5).

After the step S5, the program proceeds to Step S6 in which the relative height or distance $Bx_z$ of the intersection Bx shown in FIG. 8 is calculated by using the heights or Z coordinates of the reference points Pc and Pd in a manner corresponding to the calculation of the relative height or distance $Ax_z$ mentioned above. After the calculation in step S6, the processor proceeds to step S7 in which the relative height or distance $By_z$ of the intersection By shown in FIG. 8 is calculated by using the heights or Z coordinates of the reference points Pc and Pb in a manner corresponding to the calculation of the relative height or distance $Ay_z$ mentioned above.

After the calculation of the step S4 or S7, the processor proceeds to step S8, in which the height or distance $A_z$ or $B_z$ of the point A or B is calculated by the addition of the average value of the heights or distances in the directions of X axis and Y axis to the height or distances corresponding to the Z coordinate of the reference point Pa or Pc. This calculation corresponds to the equation (3) mentioned above.

FIG. 12 is a flowchart which shows details of the calculation of the relative height or Z coordinate of the intersection Ax in the direction of X axis performed in step S3.

As shown in FIG. 12, in step S3, the difference $(b_z-a_z)$, of the heights or distances $b_z$, $a_z$ of the reference points Pb and Pa is calculated in step S31. Then, the processor proceeds to step S32 in which the ratio (Axb/PaPb) of the distance between the reference point Pa and the intersection Ax and the distance between the reference points Pa and Pb is calculated. In the following step S33, the height or distance $Ax_z$ at the intersection Ax is calculated by the multiplication of the height or distance difference $(b_z-a_z)$ and the ratio (Axb/PaPb).

FIG. 13 is a flowchart which shows details of the calculation of the relative height or Z coordinate of the intersection Ax in the direction of Y axis performed in step S4.

As shown in FIG. 13, in step S4, the difference $(d_z-a_z)$ of the heights or distances $d_z$, $a_z$ of the reference points Pd and Pa is calculated in step S41. Then, the processor proceeds to step S42 in which the ratio (Ayd/PaPd) of the distance between the reference point Pa and the intersection Ay and the distance between the reference points Pa and Pd is calculated. In the following step S43, the height or distance $Ay_z$ at the intersection Ax is calculated by the multiplication of the height or distance difference $(d_z-a_z)$ and the ratio (Ayd/PaPd).

In this way, the estimation value of the height or distance of the insertion position is calculated by using the measured heights or Z coordinates of three of the four reference points Pa through Pd.

As described above, in the first embodiment four reference points Pa, Pb, Pc, and Pd are provided on the board 30 with a height or Z coordinate of each reference point measured. The height or distance $A_z$ or $B_z$ of the position A or B is estimated from heights or Z coordinates of three of the four reference points Pa, Pb, Pc, and Pd to correct the height or Z coordinate of the hand element 25 depending on whether the insertion position exists in the first triangle or the second triangle (the position A and position B). Accordingly, even when either the board 30 or the mother board 20 is inclined and there is distortion in the height or thickness direction, the position of the hand element 25 can be optimized.

Figures 14, 15:
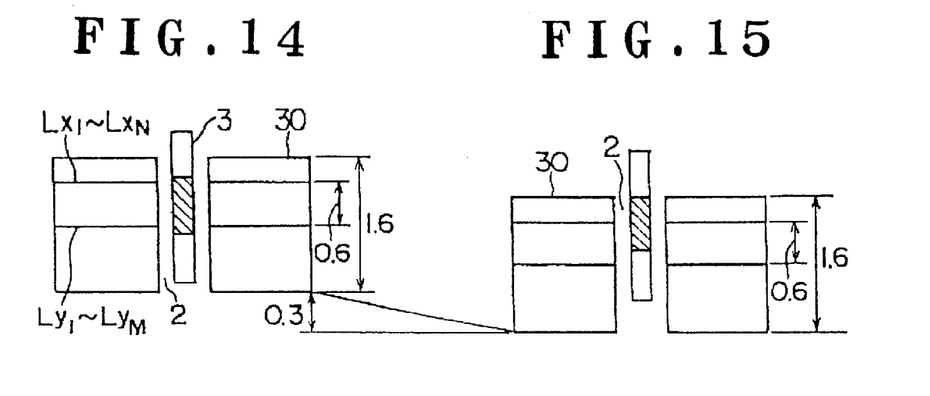
FIG. 14 to FIG. 16 are schematic views showing a state of contact fault of the connection pin.
Figure 16:
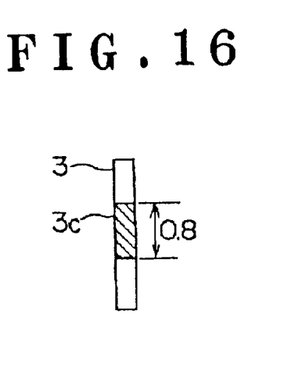

FIG. 14 to FIG. 16 are views showing the way of preventing a contact fault of the connection pin 3 by using the above-described height correction scheme according to the present invention.

In the illustrated case, the board 30 has a thickness of around 1.6 mm and is formed to have a four-layer structure. The length of the connecting section (plated with gold) of the connection pin 3 is around 0.8 mm as illustrated in FIG. 16. If a distortion of around 0.3 mm is generated in a height or thickness of the board 30, one side of the contacting section 3c with a length of 0.8 mm separates from the primary lines $Lx_1$ to $Lx_N$ or secondary-side lines $Ly_1$ to $Ly_M$, which are provided with a space of 0.06 mm. This causes a contact fault as shown in FIG. 15. By correcting a position of the hand element 25 in the height or thickness direction in accordance with the present invention, this distortion of around 0.3 mm can be accommodated, so that such troubles as contact fault are not generated as shown in FIG. 14.

Second Embodiment

Figure 17:
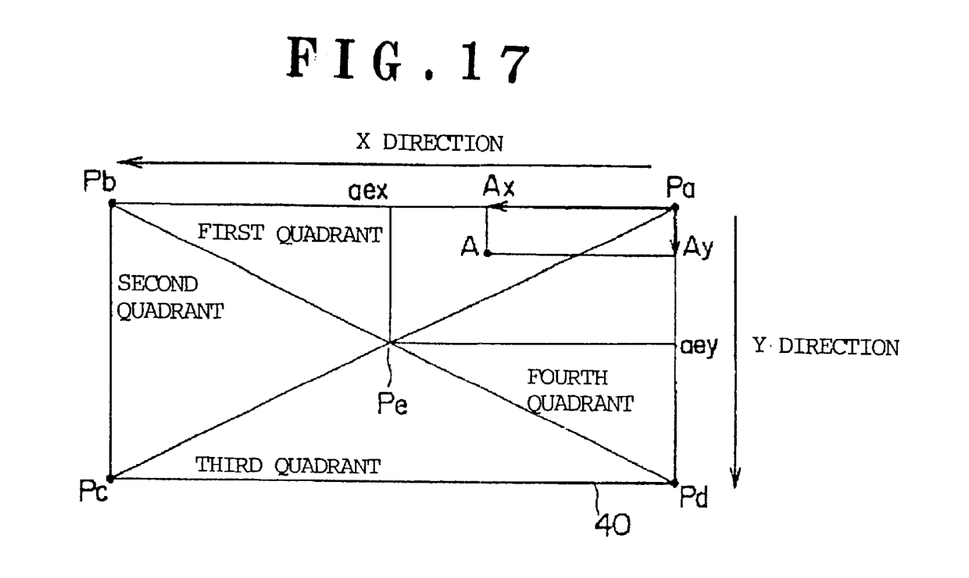
FIGS. 17 and 18 are schematic views for explaining the correction of height according to a second embodiment of the present invention.
Figure 18:
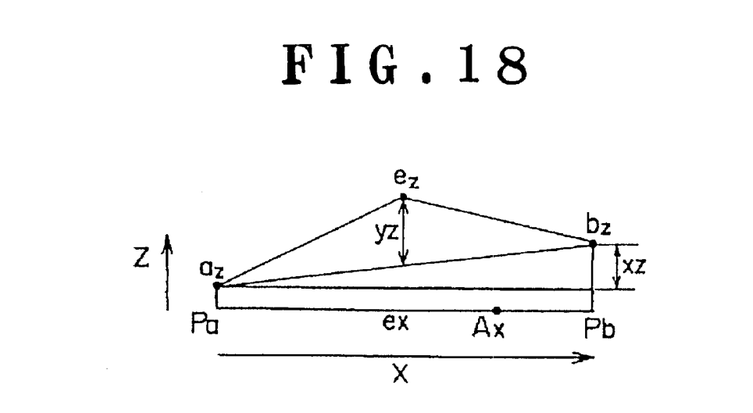

FIG. 17 and FIG. 18 are explanatory views each showing a board into which a connection pin is inserted by an orthogonal type three-axis robot according to the second embodiment of the present invention. FIG. 17 is a plan view, while FIG. 18 is a side view.

The configuration and basic operations of the orthogonal type three-axis robot according to the second embodiment are the same as those in the first embodiment shown in FIGS. 8–10, but a method of correcting a position of the hand element 25 in the height or thickness direction is different from that in the first embodiment. Particularly, a matrix board 40 with 5 reference points provided thereon is used.

When considering the actual processes of mounting parts on a board which are performed currently, the area of the matrix board required for mounting parts is becoming increasingly larger, and in the case of the first embodiment, sometimes distortion in the matrix board 30 may not completely be corrected. For this reason, in the board 40 according to the second embodiment of the present invention, four reference points Pa, Pb, Pc, Pd at vertexes of a rectangular form and a reference point Pe inside the rectangular form are provided as shown in FIG. 17. Then, the rectangular form provided with the four reference points Pa, Pb, Pc, Pd is divided into four fields around the reference point Pe used as a center. Based on heights or Z coordinate of two of these four reference points Pa, Pb, Pc, Pd as well as of the Z coordinate of the reference point Pe, by estimating a height or Z coordinate of a point inside a triangle defined by these three points, a more accurate value for correction for the height or Z coordinate is obtained. This method of correcting a height or Z coordinate is explained below with reference to FIG. 17 and FIG. 18.

Herein, heights or distances of the reference points Pa, Pb, Pc, Pd measured by the hand element 25 are indicated at $a_z$, $b_z$, $c_z$, dz, respectively. A reference value of a height or distance in the direction of X axis is indicated at $x_z$, and a reference value for a height or distance in the direction of Y axis is indicated at yz. Also, the sign Ax represents an intersection between a straight line PaPb from the reference point Pa to reference point Pb and a normal line to the straight line PaPb from point A, the sign Ay indicates an intersection between a straight line PaPd from the reference point Pa to the reference Pd and a normal line to the straight line PaPd from the point A, the sign aex indicates an intersection between the straight line PaPb from the reference point Pa to the reference point Pb and a normal line to the straight line PaPd from the reference point Pe, and the sign aey indicates an intersection between the straight line PaPd from the reference point Pa to the reference point Pd and a normal line to the straight line PaPd from the reference point Pe.

When estimating the height or Z coordinate of the point A inside the first field in FIG. 17 and FIG. 18, at first, a reference value $x_z$ for the height or distance is computed by the equation (4).

$$x_z = b_z - a_z \tag{4}$$

In accordance with the equation (5), a reference value $y_z$ for a height or distance in the Y direction is obtained by computing a difference of the height or distance ez and a component of the height or distance reference value $x_z$ for height in the X direction, and subtracting the height or distance $a_z$ from the difference value.

$$y_z = ez - x_z(Paaex/PaPb) - a_z \tag{5}$$

Then the height or distance $Ax_z$ of the intersection Ax and that $Ay_z$ of the intersection Ay are computed according to the equations (6) and (7).

$$Ax_z = x_z \times (PaAx/Pa,Pd) \tag{6}$$

$$Ay_z = yz \times (PaAy/Paaey) \tag{7}$$

Then, an estimated value AZ for a height or Z coordinate of the point A is obtained by adding the height or distance $Ax_z$ to a sum of the height or distance $Ax_z$ and height or distance $Ax_z$ through the equation (8).

$$A_z = Ax_z + Ay_z + a_z \quad (8)$$

As described above, in the second embodiment, five reference points Pa, Pb, Pc, Pd, Pe are provided on the board 40, and the heights or Z coordinates are measured by the hand element 25. The height or distance $A_z$ of the position for inserting the connection pin 3 is estimated from heights or Z coordinates of two points of the four reference points Pa, Pb, Pc, Pd as well as of the reference point Pe to correct a height or Z coordinate of the hand element 25, so that, like in Embodiment 1, even in a case where the board 40 or mother board 20 is inclined and there is distortion in the height or thickness direction, a position of the hand element 25 can be optimized. Further, the position of the hand element 25 can be optimized even if the board 40 does not have linear and homogeneous distortion, but has planar distortion instead.

It is readily understood that the calculation steps similar to those depicted in the flowcharts of FIGS. 11 through 13 are performed by the control system of FIG. 7 for the estimation of the height or Z coordinate of the specified position in the second embodiment.

It should be noted that the present invention is not limited to the embodiments described above, and that various variants are possible. The variants include, for instance, those described below.

(i) First and second embodiments above were described assuming a case where the connection pin 3 was inserted, but also the possibility of failure is eliminated, when removing the connection pin 3, by correcting a height or Z coordinate of the hand element 25, so that the work efficiency of the orthogonal the three-axis robot can be improved.

(ii) Also in the wire bonding process which is a step of assembling a semiconductor integrated circuit (IC), size of a wafer has been becoming increasingly larger, so that, also in a case of the orthogonal type three-axis robot executing wire bonding, distortion of a lead frame with a wafer chip loaded thereon or the like can be absorbed by correcting a position in the height or thickness direction, and reliability in bonding is improved.

As described above, in accordance with the features associated with the first to third aspects of the present invention, in an orthogonal type three-axis robot comprising a holding device, a driving system for moving the holding device, and a measuring device, a moving distance of the holding device in the direction of Z axis is corrected for each specified position of a board. Hence even if a surface of the board is distorted in the height or thickness direction due to inclination of a base or for other reasons, a height or Z coordinate of the holding device is optimized for each position at which parts are mounted, or from which parts are removed, and for this reason the work efficiency is improved with the product quality also improved.

In accordance with the features associated with the fourth to sixth aspects of the present invention, in the orthogonal type three-axis robot comprising a holding device, a driving system for moving the holding device, and a measuring device, a moving distance of the holding device in the direction of Z axis is corrected for each position of the board. Hence, even if a board surface is distorted in the height or thickness direction due to inclination of a base or for some other reasons, a height or Z coordinate of the holding device is optimized for each position into which parts are incorporated, or from which parts are removed, and the work efficiency is improved with the product quality also improved.

What is claimed is:

1. A method of controlling an orthogonal type three-axis robot having
   (i) a holding device to hold a part to be mounted onto or removed from a board fixed on a base,
   (ii) a driving system to support the holding device relative to the base and move the holding device along a direction of an X axis which corresponds to a lateral direction of the board, move the holding device along a direction of a Y axis which corresponds to a longitudinal direction of the board, and move the holding device along a direction of a Z axis which corresponds to a thickness direction of the board, and
   (iii) a measuring device to determine a Z axis coordinate of a surface of the board, wherein said driving system is to move said holding device along the direction of the X axis, Y axis and Z axis according to the determined Z axis coordinate in order to position said holding device such that at a specified position a part can be mounted onto the board or such that at a specified position a part can be removed from the board,
   said method comprising, when said holding device is moved by said driving system, correcting for the specified position a moving distance of said holding device along the direction of the Z axis based on a location of the specified position.

2. The method of controlling an orthogonal type three-axis robot according to claim 1, wherein the correcting of the moving distance includes
   using said measuring device at three points to determine three Z axis coordinates of the surface of the board, with said three points defining a triangle,
   estimating from the three determined Z axis coordinates and, from X axis and Y axis coordinates of said three points and said specified position, a Z axis coordinate of the specified position, wherein the specified position is located within the triangle defined by said three points, and
   when said holding device is moved by said driving system, correcting the moving distance of the holding device along the direction of the Z axis according to the estimated Z axis coordinate.

3. The method of controlling an orthogonal type three-axis robot according to claim 2, wherein using said measuring device at three points to determine three Z axis coordinates of the surface of the board includes
   using said measuring device at four points to determine four Z axis coordinates of the surface of the board, with said four points defining a rectangle, and then selecting three of the four determined Z axis coordinates as the three Z axis coordinates.

4. The method of controlling an orthogonal type three-axis robot according to claim 2, wherein using said measuring device at three points to determine three Z axis coordinates of the surface of the board includes
   using said measuring device at five points to determine five Z axis coordinates of the surface of the board, with four of said five points defining a rectangle and with the fifth of said five points located within said rectangle, and then selecting the determined Z axis coordinate corresponding to said fifth point and two of the four Z axis coordinates corresponding to said four points as the three Z axis coordinates.

5. The method of controlling an orthogonal type three-axis robot according to claim 1, wherein there are plural specified positions and the moving distance of said holding device along the direction of the Z axis is corrected for each said plural specified position based on a location of a respective said plural specified position.

6. The method of controlling an orthogonal type three-axis robot according to claim 5, wherein the correcting of the moving distance includes using said measuring device at three points to determine three Z axis coordinates of the surface of the board, with said three points defining a triangle, estimating from the three determined Z axis coordinates and, from X axis and Y axis coordinates of said three points and said specified position, a Z axis coordinate of the specified position, wherein the specified position is located within the triangle defined by said three points, and when said holding device is moved by said driving system, correcting the moving distance of the holding device along the direction of the Z axis according to the estimated Z axis coordinate.

7. The method of controlling an orthogonal type three-axis robot according to claim 6, wherein using said measuring device at three points to determine three Z axis coordinates of the surface of the board includes using said measuring device at four points to determine four Z axis coordinates of the surface of the board, with said four points defining a rectangle, and then selecting three of the four determined Z axis coordinates as the three Z axis coordinates.

8. The method of controlling an orthogonal type three-axis robot according to claim 6, wherein using said measuring device at three points to determine three Z axis coordinates of the surface of the board includes using said measuring device at five points to determine five Z axis coordinates of the surface of the board, with four of said five points defining a rectangle and with the fifth of said five points located within said rectangle, and then selecting the determined Z axis coordinate corresponding to said fifth point and two of the four Z axis coordinates corresponding to said four points as the three Z axis coordinates.

9. The method of controlling an orthogonal type three-axis robot according to claim 5, wherein the correcting of the moving distance includes using a Z axis coordinate of the surface of the board as determined by said measuring device.

10. The method of controlling an orthogonal type three-axis robot according to claim 5, wherein the correcting of the moving distance includes using Z axis coordinates of the surface of the board as determined by said measuring device at more than two points that define an area within which is located the specified position.

11. The method of controlling an orthogonal type three-axis robot according to claim 10, wherein said more than two points are located on an outer periphery of an area defined by the X and Y axes within which said holding device is movable.

12. The method of controlling an orthogonal type three-axis robot according to claim 1, wherein the correcting of the moving distance includes using a Z axis coordinate of the surface of the board as determined by said measuring device.

13. The method of controlling an orthogonal type three-axis robot according to claim 1, wherein the correcting of the moving distance includes using Z axis coordinates of the surface of the board as determined by said measuring device at more than two points that define an area within which is located the specified position.

14. The method of controlling an orthogonal type three-axis robot according to claim 13, wherein said more than two points are located on an outer periphery of an area defined by the X and Y axes within which said holding device is movable.

15. An orthogonal type three-axis robot comprising:

a holding device to hold a part to be mounted onto or removed from a board fixed on a base, a driving system to support the holding device relative to the base and move the holding device along a direction of an X axis which corresponds to a lateral direction of the board, move the holding device along a direction of a Y axis which corresponds to a longitudinal direction of the board, and move the holding device along a direction of a Z axis which corresponds to a thickness direction of the board, and a measuring device to determine a Z axis coordinate of a surface of the board, wherein said driving system is to move said holding device along the direction of the X axis, Y axis and Z axis according to the determined Z axis coordinate in order to position said holding device such that a part can be mounted at a specified position on the board or such that a part can be removed from a specified position on the board, wherein when said holding device is moved by said driving system, said driving system is to correct for the specified position a moving distance of said holding device along the direction of the Z axis based on a location of the specified position.

16. The orthogonal type three-axis robot according to claim 15, wherein said measuring device is to determine at three points three Z axis coordinates of the surface of the board, with said three points defining a triangle, and said driving system is to estimate from the three determined Z axis coordinates and, from X axis and Y axis coordinates of the three points and the specified position, a Z axis coordinate of the specified position, wherein the specified position is located within the triangle defined by the three points, and is then to, when said holding device is moved by said driving system, correct the moving distance of the holding device along the direction of the Z axis according to the estimated Z axis coordinate.

17. The orthogonal type three-axis robot according to claim 16, wherein said measuring device is to determine at a fourth point a fourth Z axis coordinate of the surface of the board, with the four points defining a rectangle and with three of the four Z axis coordinates being selected as the three Z axis coordinates.

18. The orthogonal type three-axis robot according to claim 16, wherein said measuring device is to determine at a fourth point and a fifth point respective fourth and fifth Z axis coordinates of the surface of the board, with the first through fourth points defining a rectangle within which is located the fifth point and, with the determined Z axis coordinate corresponding to the fifth point along with two of the four Z axis coordinates corresponding to the four points being selected as the three Z axis coordinates.

19. The orthogonal type three-axis robot according to claim 15, wherein when said holding device is moved by said driving system, said driving system is to correct for additional specified positions a moving distance of said holding device along the direction of the Z axis based on a location of a respective said additional specified position.

20. The orthogonal type three-axis robot according to claim 19, wherein said measuring device is to determine at three points three Z axis coordinates of the surface of the board, with said three points defining a triangle, and said driving system is to estimate from the three determined Z axis coordinates and, from X axis and Y axis coordinates of the three points and the specified position, a Z axis coordinate of the specified position, wherein the specified position is located within the triangle defined by the three points, and is then to, when said holding device is moved by said driving system, correct the moving distance of the holding device along the direction of the Z axis according to the estimated Z axis coordinate.

21. The orthogonal type three-axis robot according to claim 19, wherein said measuring device is to determine at a fourth point a fourth Z axis coordinate of the surface of the board, with the four points defining a rectangle and with three of the four Z axis coordinates being selected as the three Z axis coordinates.

22. The orthogonal type three-axis robot according to claim 19, wherein said measuring device is to determine at a fourth point and a fifth point respective fourth and fifth Z axis coordinates of the surface of the board, with the first through fourth points defining a rectangle within which is located the fifth point and, with the determined Z axis coordinate corresponding to the fifth point along with two of the four Z axis coordinates corresponding to the four points being selected as the three Z axis coordinates.

23. The orthogonal type three-axis robot according to claim 19, wherein said driving system is to correct the moving distance by using a Z axis coordinate of the surface of the board as determined by said measuring device.

24. The orthogonal type three-axis robot according to claim 19, wherein said driving system is to correct the moving distance by using Z axis coordinates of the surface of the board as determined by said measuring device at more than two points that define an area within which is located the specified position.

25. The orthogonal type three-axis robot according to claim 24, wherein said more than two points are located on an outer periphery of an area defined by the X and Y axes within which said holding device is movable.

26. The orthogonal type three-axis robot according to claim 15, wherein said driving system is to correct the moving distance by using a Z axis coordinate of the surface of the board as determined by said measuring device.

27. The orthogonal type three-axis robot according to claim 15, wherein said driving system is to correct the moving distance by using Z axis coordinates of the surface of the board as determined by said measuring device at more than two points that define an area within which is located the specified position.

28. The orthogonal type three-axis robot according to claim 27, wherein said more than two points are located on an outer periphery of an area defined by the X and Y axes within which said holding device is movable.

* * * * *